United States Patent
Kim (10) Patent No.: US 9,676,264 B2
(45) Date of Patent: Jun. 13, 2017

(54) BYPASS FLOW PATH OPEN/CLOSE TYPE ACTIVE ENGINE MOUNT DEVICE USING AIR CHAMBER

(71) Applicant: HYUNDAI MOTOR COMPANY, Seoul (KR)

(72) Inventor: Seung-Won Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/919,654

(22) Filed: Oct. 21, 2015

(65) Prior Publication Data
US 2016/0108988 A1   Apr. 21, 2016

(30) Foreign Application Priority Data
Oct. 21, 2014 (KR) .................. 10-2014-0142397

(51) Int. Cl.
*F16F 13/26* (2006.01)
*B60K 5/12* (2006.01)

(52) U.S. Cl.
CPC .......... *B60K 5/1208* (2013.01); *F16F 13/262* (2013.01); *B60K 5/1283* (2013.01)

(58) Field of Classification Search
CPC ........ F16F 13/26; F16F 13/262; F16F 13/266; F16F 13/105; F16F 13/106; F16F 13/107
USPC ...................................... 267/140.14, 140.15
See application file for complete search history.

(56) References Cited

U.S. PATENT DOCUMENTS

| | | | | |
|---|---|---|---|---|
| 5,344,127 A * | 9/1994 | Hettler | .................... | F16F 13/26 267/140.13 |
| 6,378,852 B1 * | 4/2002 | Ticks | .................... | F16F 13/264 267/140.14 |
| 6,439,554 B1 * | 8/2002 | Takashima | .............. | F16F 13/26 267/140.13 |
| 7,448,605 B2 | 11/2008 | Bretaudeau et al. | | |
| 2003/0011116 A1 * | 1/2003 | Kodama | .................. | F16F 13/26 267/140.13 |
| 2006/0082036 A1 * | 4/2006 | Miyahara | .................. | F16F 7/12 267/140.13 |

(Continued)

FOREIGN PATENT DOCUMENTS

| | | | | |
|---|---|---|---|---|
| DE | 19861063 A1 * | 1/2000 | ............ | F16F 13/106 |
| JP | 08-210424 A | 8/1996 | | |

(Continued)

*Primary Examiner* — Bradley King
*Assistant Examiner* — Stephen Bowes
(74) *Attorney, Agent, or Firm* — McDermott Will & Emery LLP (57) ABSTRACT

An active engine mount has a liquid chamber for keeping liquid in a housing. The active engine mount includes a separation plate that is disposed in the liquid chamber, has a space at its center, and divides the liquid chamber into an upper liquid chamber and a lower liquid chamber. At least one primary flow path connects the upper liquid chamber and the lower liquid chamber. An orifice plate is disposed under the space at the center of the separation plate and has at least one bypass flow path connected with the lower liquid chamber. An air chamber is disposed between the orifice plate and the space at the center of the separation plate, and is configured to open or close the at least one bypass flow path by changing its size.

5 Claims, 6 Drawing Sheets

(56) References Cited

U.S. PATENT DOCUMENTS

2009/0102105 A1* 4/2009 Hasegawa .............. F16F 13/262
                                                            267/122

FOREIGN PATENT DOCUMENTS

| KR | 10-2009-0032018 A | 3/2009 |
| KR | 10-2009-0131165 A | 12/2009 |

* cited by examiner

Figure 1

Related Art

BYPASS FLOW PATH OPEN/CLOSE TYPE ACTIVE ENGINE MOUNT DEVICE USING AIR CHAMBER

CROSS-REFERENCE TO RELATED APPLICATIONS

This application claims the benefit of priority under 35 U.S.C. §119 to Korean Patent Application No. 10-2014-142397, filed on Oct. 21, 2014, in the Korean Intellectual Property Office, the disclosure of which is incorporated herein by reference in its entirety.

TECHNICAL FIELD

The present disclosure relates to an automotive active engine mount equipped in a vehicle, and more particularly, to a bypass flow path open/close type active engine mount using an air chamber that can optimize a loss factor and a dynamic characteristic by using an air chamber of which contraction/expansion can be controlled by a solenoid valve for opening/closing a bypass flow path.

BACKGROUND

Automotive engines not only keep vibrating for the structure, but vibrate depending on the conditions of the ground while vehicles run. The vibrations are caused by not an independent factor, but various composite factors, vertically, laterally, and longitudinally.

The engines generate considerable vibrations due to a periodical change of the center position by the vertical motion of pistons and connecting rods, the inertia force in reciprocation in the axial direction of cylinders, and a periodical change of torque applied to a crankshaft from the connecting rods.

Accordingly, the engines are mounted on an engine mount to reduce vibration that is transmitted to the chassis frame or the car body.

A semi-active mount (active engine mount) that has been developed up to now is largely classified into a Bypass type using vacuum negative pressure and a volume-stiffness type using an electronic solenoid valve. The bypass type using vacuum negative pressure is difficult to manufacture, so the volume-stiffness type using a solenoid valve has been increasingly popularized.

The volume-stiffness type can be controlled by an electronic solenoid valve and does not generate a dynamic shoot-up when it is in an open mode (an idling mode), so it is very strong against vibration.

However, when it is in a close mode (driving mode), due to the relationship between a dynamic change rate and a loss factor, there are necessarily many errors in trade-off in which the loss factor is small when the dynamic change rate is large, and the loss factor can be slightly improved when the dynamic change rate is small, it has small dynamic change rate and loss factor in comparison to the by-pass type.

Figure 1:
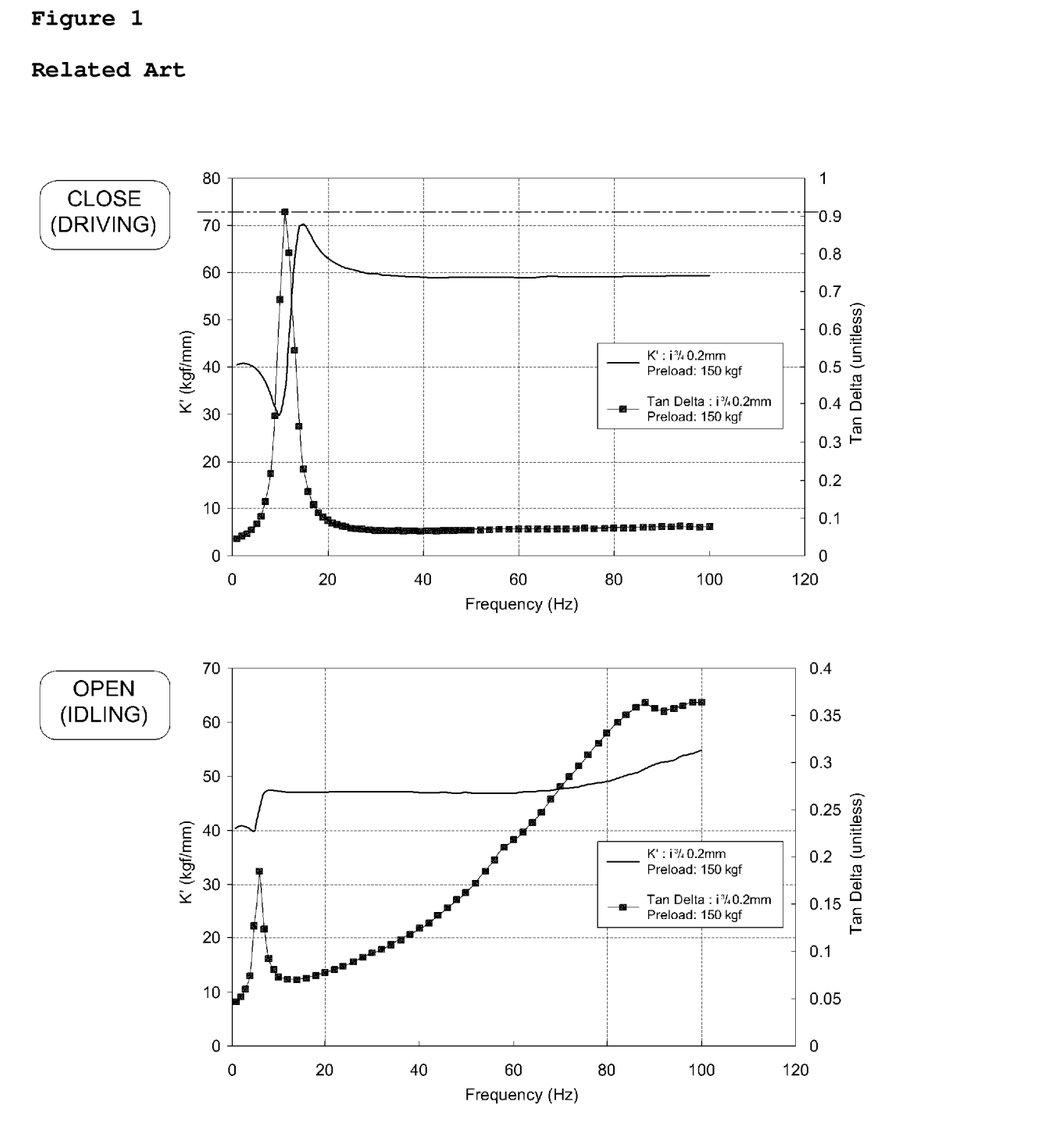
FIG. 1 is a graph illustrating a loss factor of an active engine mount of the related art in driving and idling.

In connection with this matter, FIG. 1 provides a graph illustrating a loss factor of an active engine mount of the related art in driving and idling and it can be seen from the figure that the loss factor is 1.0 or less even in driving.

As a result, there is a need for an electronic active engine mount having the advantages of both of the by-pass type and the volume-stiffness type that can increase a loss factor at a high dynamic change rate, and if necessary, can reduce the dynamic change rate to increase an insulation ratio in driving.

SUMMARY

The present disclosure has been made in an effort to provide an engine mount that shows an optimal performance fitting to driving conditions by increasing a loss factor and further changing characteristics in accordance with driving conditions, using an air chamber that opens/closes a bypass chamber by changing in size on an active engine mount.

The present disclosure has also been made in an effort to provide a engine mount that achieves the advantages of both of a by-pass type and a volume-stiffness type, using an air chamber that opens/closes a vertical flow path while absorbing vibration.

The technical subjects of the present invention are not limited to the technical problems described above and other technical subjects that are not stated herein will be clearly understood by those skilled in the art from the following specifications.

An exemplary embodiment of the present invention provides an active engine mount that has a liquid chamber for keeping liquid in a housing. The active engine mount includes a separation plate that is disposed in the liquid chamber, has a space at its center, and divides the liquid chamber into an upper liquid chamber and a lower liquid chamber. At least one primary flow path connects the upper liquid chamber and the lower liquid chamber. An orifice plate is disposed under the space at the center of the separation plate and has at least one bypass flow path connected with the lower liquid chamber. An air chamber is disposed between the orifice plate and the space at the center of the separation plate, and is configured to opens or close the at least one bypass flow path by changing its size.

In certain embodiments, the active engine mount further includes a piston connected to a bottom of the air chamber and configured to move vertically relative to the air chamber. The air chamber may be contracted or expanded by pneumatic pressure adjusted by vertical movement of the piston.

In certain embodiments, the piston may be configured to move vertically using a solenoid valve.

In certain embodiments, the piston may be connected to a piston return spring. In certain embodiments, the piston return spring may include rubber.

In certain embodiments, the at least one primary flow path may be two or more primary flow paths, and the at least one bypass flow path may be two or more bypass flow paths.

In certain embodiments, the air chamber may be configured to open the at least one bypass flow path by contracting when 0.5 or less pneumatic pressure is applied, and it may be configured to close the at least one bypass flow path by expanding when 1 or more pneumatic pressure is applied.

According to certain embodiments of the present invention, since the air chamber opening/closing a bypass flow path by changing in size is applied to an active engine mount, the active engine mount may have a large dynamic change rate and loss factor.

In certain embodiments, the mode of the active engine mount can be controlled only by a one-way solenoid valve in accordance with all of driving conditions, so continuous control of a vehicle can be performed step by step for the driving conditions.

It is also possible to use the advantages of both of a by-pass type active engine mount and a volume-stiffness type active engine mount.

DETAILED DESCRIPTION

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms to describe most appropriately the best method he or she knows for carrying out the invention. Therefore, the configurations described in the embodiments and drawings of the present invention are merely embodiments but do not represent all of the technical spirit of the present invention. Thus, the present invention should be construed as including at least all the changes, equivalents, and substitutions included in the spirit and scope of the present disclosure and claims at the time of filing this application.

The terminologies used herein are for describing specific embodiments and do not limit the present invention. As used herein, singular terms may include plural terms, if not clearly indicating other cases in the contexts.

The present provides an engine mount that illustrates an optimal performance fitting to driving conditions by increasing a loss factor and further changing characteristics in accordance with driving conditions, using an air chamber that opens/closes a bypass chamber by changing in size on an active engine mount 100. The engine mount 100 includes a separation plate 200 that is disposed in a liquid chamber, has a space at the center, and divides the liquid chamber into an upper liquid chamber 210 and a lower liquid chamber 220, at least one primary flow path 300 that connects the upper liquid chamber and the lower liquid chamber, an orifice plate 900 that is disposed under the space at the center of the separation plate and has at least one bypass flow path 400 connected with the lower liquid chamber, and an air chamber 500 that is disposed between the orifice plate and the space at the center of the separation plate and opens/closes the bypass flow path by changing in size. In certain embodiments, there may be two or more primary flow paths 300. In certain embodiments, there may be two or more bypass flow paths 400.

Figure 2:
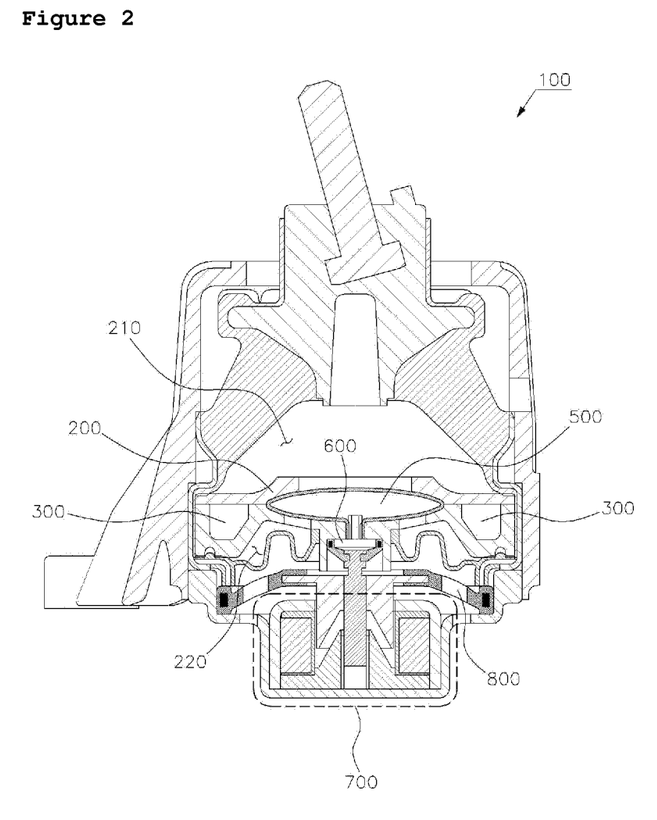
FIG. 2 is a cross-sectional view of a bypass flow path open/close type active engine mount using an air chamber according to an embodiment of the present invention.

FIG. 2 is a cross-sectional view of a bypass flow path open/close type active engine mount using an air chamber according to an embodiment of the present invention.

In certain embodiments, the air chamber 500, which changes in size by adjustment of pneumatic pressure, may be a balloon-like air chamber. In certain embodiments, a vertically moving piston 600 is connected to the bottom of the air chamber, so as the piston adjusts pneumatic pressure, the air chamber opens and closes the bypass flow path by contracting and expanding, respectively.

In certain embodiments, the piston 600 is connected with a piston return spring 800, which in certain embodiments is made of rubber such that the piston can vertically move, and it can vertically move using a solenoid valve 700.

The solenoid valve 700, which in certain embodiments is an electronic valve, in certain embodiments is an automatic valve that is automatically opened when electricity is supplied and a flange is moved up, and is closed by the weight of the flange when the electricity is shut down. That is, it is a valve that is controlled by the features of a solenoid.

Therefore, according to certain embodiments of the present invention, the piston 600 is vertically moved by the one-way solenoid valve 700 and adjusts pneumatic pressure of the air chamber 500, thereby opening/closing the bypass flow path 400.

Figure 3:
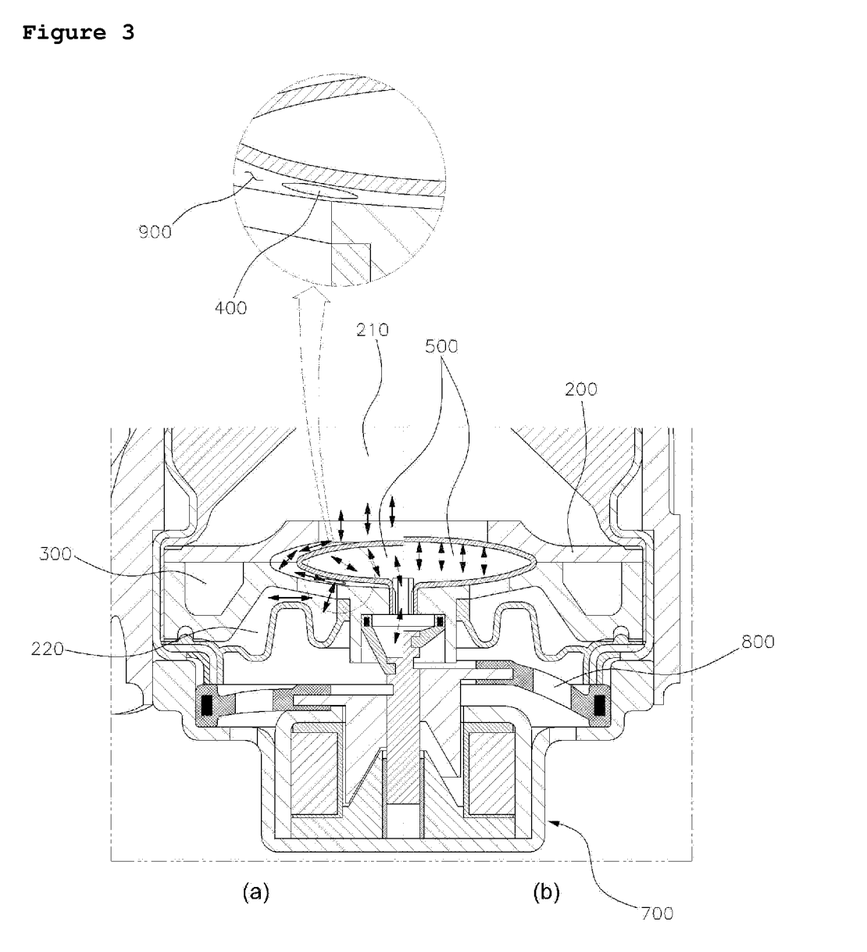
FIG. 3 is a cross-sectional view illustrating flow of fluid in contracting/expanding of an air chamber according to an embodiment of the present invention.

FIG. 3 is a cross-sectional view illustrating flow of fluid in contracting/expanding of an air chamber according to an embodiment of the present invention.

In (a) at the left side, flow of fluid in a bypass flow path open/close type active engine mount using the air chamber 500 in idling is illustrated, in which fluid is flows to the bypass flow path 400 opened to by contraction of the air chamber, other than the primary flow path 300.

That is, as the bypass flow path 400 vertically opens, idle vibration due to a reduction of low-frequency dynamic characteristic in idling is improved.

In (b) at the right side, flow of fluid in the bypass flow path open/close type active engine mount using the air chamber 500 in driving is illustrated, in which the bypass flow path 400 is closed and only the air chamber and the primary flow path 300 are operated, thereby achieving an optimum system.

Figure 4:
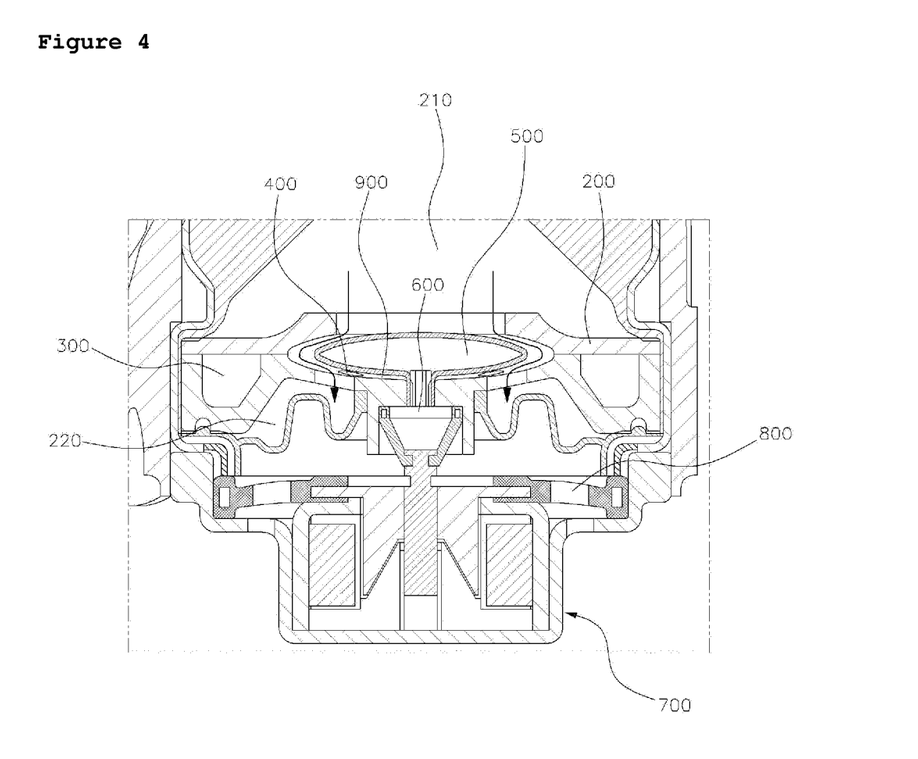
FIG. 4 is a cross-sectional view illustrating flow of fluid in a bypass flow path open/close type active engine mount in idling, according to an embodiment of the present invention.
Figure 5:
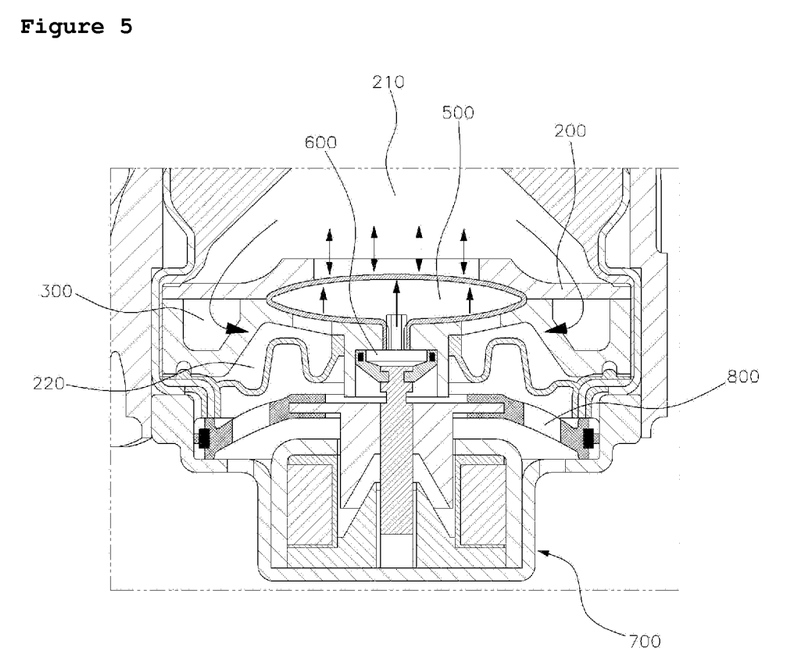
FIG. 5 is a cross-sectional view illustrating flow of fluid in a bypass flow path open/close type active engine mount in driving on a level road, according to an embodiment of the present invention.
Figure 6:
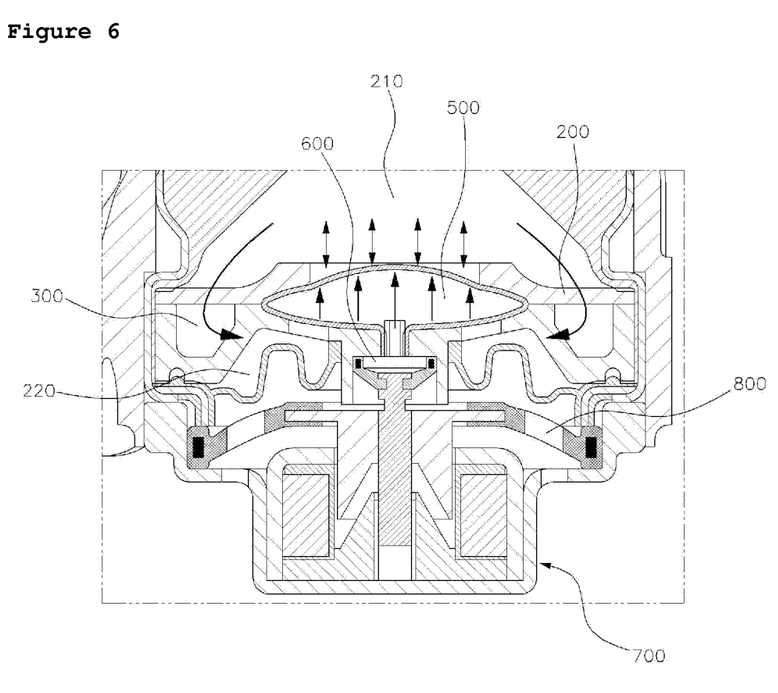
FIG. 6 is a cross-sectional view illustrating flow of fluid in a bypass flow path open/close type active engine mount in driving on a rough road, according to an embodiment of the present invention.

FIG. 4 is a cross-sectional view illustrating flow of fluid in a bypass flow path open/close type active engine mount in idling, according to an embodiment of the present invention, FIG. 5 is a cross-sectional view illustrating flow of fluid in a bypass flow path open/close type active engine mount in driving on a level road, according to an embodiment of the present invention, and FIG. 6 is a cross-sectional view illustrating flow of fluid in a bypass flow path open/close type active engine mount in driving on a rough road, according to an embodiment of the present invention.

Referring to FIG. 4 first, which shows an embodiment of the bypass flow path open/close type active engine mount in idling, in which a current of 2 A, for example, flows to the solenoid valve 700, 0.5 atmospheric pressure (negative pressure) is applied to the air chamber 500, and the bypass flow path 400 is opened.

Flow of fluid in this case is the same as that in (a) of FIG. 3.

Referring to FIG. 5, which illustrates an embodiment of the bypass flow path open/close type active engine mount in driving on a level road, in which a current of 0.5 A flows to the solenoid valve 700, 1 atmospheric pressure (atmospheric pressure) is applied to the air chamber 500, and the bypass flow path 400 is closed.

Flow of fluid in this case is the same as that in (b) of FIG. 3.

Referring to FIG. 6, which illustrates an embodiment of the bypass flow path open/close type active engine mount in driving on a rough road, in which a current of OA flows to the solenoid valve 700, 1.5 atmospheric pressure (increment pressure) is applied to the air chamber 500, and the bypass flow path 400 is closed.

Flow of fluid in this case is the same as that in (b) of FIG. 3 and the air chamber 500 further expands and hardens that in driving on a level road, so the loss factor is further increased.

As a result, according to certain embodiments of the present invention, the balloon-like air chamber that changes in size by pneumatic pressure is disposed in the active engine mount and the bypass flow path is opened/closed by the air chamber, so the active engine mount increases a dynamic change rate and a loss factor in accordance with driving conditions.

According to certain embodiments of the present invention, even if the driving conditions change, the mode of the active engine mount can be controlled only by a one-way solenoid valve, such that continuous control of a vehicle can be performed step by step for the driving conditions, and accordingly, it is possible to use the advantages of both of a by-pass type active engine mount and a volume-stiffness type active engine mount.

Although the present invention has been described with reference to detailed embodiments, the present invention is not limited thereto. The embodiments described above may be changed or modified by those skilled in the art without departing from the scope of the present invention and may be change and modified in various ways within the range equal to the spirit of the present invention and the claims to be described below.

What is claimed is:

1. An active engine mount that has a liquid chamber for keeping liquid in a housing, the active engine mount comprising:

a separation plate that is disposed in the liquid chamber, has a space at its center, and divides the liquid chamber into an upper liquid chamber and a lower liquid chamber;

at least one primary flow path that connects the upper liquid chamber and the lower liquid chamber;

an orifice plate that is disposed under the space at the center of the separation plate and has at least one bypass flow path connected with the lower liquid chamber; and an air chamber that is disposed between the orifice plate and the space at the center of the separation plate and is configured to open or close the at least one bypass flow path by changing its size; and a piston connected to a bottom of the air chamber and configured to move towards and away from the air chamber in an up and down direction;

wherein the air chamber is contracted or expanded by pneumatic pressure adjusted by towards the upper and lower sides movement of the piston.

2. The active engine mount of claim 1, wherein the piston is configured to move towards and away from the air chamber in an up and down direction using a solenoid valve.

3. The active engine mount of claim 1, wherein the piston is connected to a piston return spring.

4. The active engine mount of claim 3, wherein the piston return spring comprises rubber.

5. The active engine mount of claim 1, wherein the at least one primary flow path is two or more primary flow paths, and the at least one bypass flow path is two or more bypass flow paths.

* * * * *